United States Patent [19]
Givens et al.

[11] 4,021,203

[45] * May 3, 1977

[54] CATALYTIC CONVERTER FOR PURIFYING GASES

[75] Inventors: William R. Givens, Hoffman Estates; Charles D. Lemme, Oak Park, both of Ill.

[73] Assignee: Maremont Corporation, Chicago, Ill.

[ * ] Notice: The portion of the term of this patent subsequent to July 13, 1993, has been disclaimed.

[22] Filed: Jan. 14, 1976

[21] Appl. No.: 649,512

Related U.S. Application Data

[62] Division of Ser. No. 419,132, Nov. 26, 1973, Pat. No. 3,969,083.

[52] U.S. Cl. .................. 23/288 FC; 23/288 FB
[51] Int. Cl.² .................. B01J 8/02; B01J 35/04; F01N 3/15
[58] Field of Search ..... 23/288 F, 288 FA, 288 FB, 23/288 FC; 423/213.7, 212, 212 C, 213.2

[56] References Cited

UNITED STATES PATENTS

| | | |
|---|---|---|
| 3,149,925 | 9/1964 | Scheithin ..................... 23/288 F |
| 3,692,497 | 9/1972 | Keith et al. .................. 23/288 FC |
| 3,754,870 | 8/1973 | Carnahan et al. ............. 23/288 FC |
| 3,798,006 | 3/1974 | Balluff ........................ 23/288 FC |
| 3,801,289 | 4/1974 | Wiley .......................... 23/288 FC |

Primary Examiner—Joseph Scovronek
Attorney, Agent, or Firm—Cushman, Darby & Cushman

[57] ABSTRACT

An improved catalytic converter for the exhaust gases of an automotive engine is disclosed, the converter including a plurality of honeycomb type catalyst carrier elements, annular spacer members and cushioning rings mounted in compressed sandwich fashion within a cylindrical casing section so that the only rigid connection is between the ends of the assembled sandwich and the casing, the cushioning rings being formed of compressed metallic wires and having a triangular cross-sectional configuration which compressively engages within correspondingly shaped annular spaces at the ends of the carrier elements so that the compressive forces of each cushioning ring are transmitted to the associated carrier element with a radially inward component and a longitudinally inward component.

7 Claims, 2 Drawing Figures

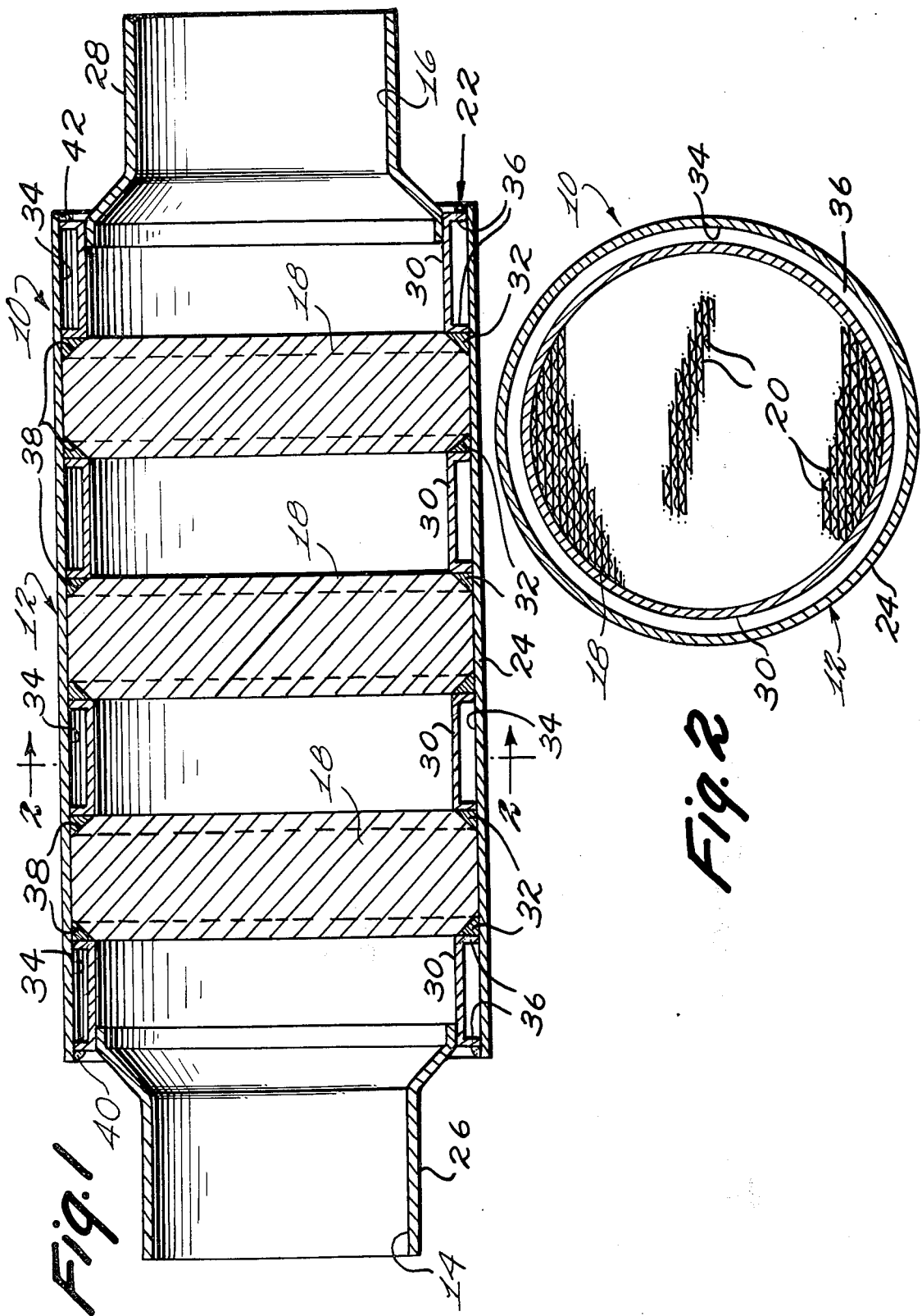

CATALYTIC CONVERTER FOR PURIFYING GASES

This application is a division of Ser. No. 419,132, filed Nov. 26, 1973, now U.S. Pat. No. 3,969,083, dated July 13, 1976.

This invention relates to the purification of gases and more particularly to improvements in the known methods and devices for effecting purification by catalytic reaction with the use of solid honeycomb type catalyst carriers.

The use of a honeycomb type catalyst carrier for the purification of engine exhaust gases is well known. An example of a catalytic converter embodying such a catalyst carrier is disclosed in U.S. Pat. No. 3,441,381.

Catalytic converters of the type disclosed in the above patent have been tested, in accordance with established test procedures, in the exhaust systems of many of the automobile engines contemplated for future production for the purpose of determining whether the devices have the effect of limiting the exhaust pollutants to the levels required. Results have indicated a need to improve the performance and effectiveness of the devices, particularly in the cold start testing procedures.

It is well known that the conversion reaction of the pollutant constituents is greatly affected by the temperature at which the reaction takes place. The usual pattern of performance in cold start tests is that a very high percentage of the total pollutants collected during the entire test period are collected during an initial period which is a very small part of the total test period, indicating that the rate of conversion reaction at start up increases as the temperature of the reaction environment increases.

In addition to the critical need for increased performance in cold start tests, there is always the need to increase the overall conversion efficiency of devices of this type. Furthermore, physical deterioration of the catalyst and catalyst carrier is a continuing problem as is evident from the discussion contained in the opening paragraphs of the specification of the aforementioned patent. In this regard, see also subsequently issued commonly assigned U.S. Pat. No. 3,692,497.

Accordingly, it is an object of the present invention to improve the cold-start test performance, conversion efficiency, and physical durability of catalytic converters of the type referred to above by providing improved operating procedures and structural arrangement of component parts. In accordance with the principles of the present invention, these objectives are obtained by providing for a change in the confinement of the exhaust gases to a relatively unrestricted turbulent condition during the restricted flow along the multiplicity of parallel restricted flow paths in contact with the catalyst before any substantial portion of such restricted flow changes from its initial turbulent condition to a fully developed laminar condition and then repeating the confinement to parallel restricted flow and change to relatively unrestricted flow for a sufficient number of times to effect the required level of pollutant conversion. By this procedure substantially all of the contact between the pollutant constituents and the catalyst takes place while the gas containing the pollutant constituents is in a generally turbulent condition with substantially no contact being effected while the gas is in a fully developed laminar condition. By insuring such conditions, the effective thermal inertia of the catalyst carrier and hence its heat-up rate is greatly improved, the conversion efficiency is improved and the problems of physical deterioration are alleviated.

The basis of these improvements can be appreciated by viewing the different operating procedures and structural arrangement of component parts provided in the prior art, as for example, the disclosure of the above-mentioned patents, in relation to the principles of the present invention as enunciated above. When the normal range of exhaust gas flow velocities issuing from known internal combustion engines is considered in relation to the specific example disclosed in U.S. Pat. No. 3,441,381 utilizing a 3 inches long 4⅞ inches diameter catalyst carrier (see column 9, lines 59–62), it will be appreciated that the specified size of the flow channels and the restriction to flow provided by the walls of the channels are such that flow of gases therethrough, while entering in a turbulent condition, soon are changed into a laminar condition. The calculations based upon the Reynolds number involved, indicate that fully developed laminar flow will occur in the last two inches of the total three inch length of travel provided during normal operation. Viewed in the light of the principles of the present invention, rather than substantially all of the gas-to-catalyst contact being effected when the gas is in a generally turbulent flow condition, only about one-third of the gas-to-catalyst contact is effected with the gas in this condition, while two-thirds of the contact is effected with the gas in a fully developed laminar flow condition.

It can be appreciated that since both heat transfer and pollutant reaction are a direct function of the number of gas molecules which collide with the flow confinement walls, a substantially greater number of molecular collisions are obtained under turbulent flow conditions than under laminar flow conditions. Indeed, the boundary layers present during fully developed laminar flow, which are progressively built up in the transition from turbulent to laminar flow, inhibit both heat transfer and conversion reaction.

In terms of structural changes, the different operating procedures of the present invention can be obtained by providing a plurality of separate catalyst carrier elements of the type disclosed in U.S. Pat. No. 3,441,381 having size characteristics as hereinafter stated and mounting the separate elements in series within the exhaust gas flow path in longitudinally spaced relation with respect to one another to insure that a turbulent gas flow condition is clearly established at the entry of each separate element.

With respect to the problems of physical deterioration mentioned so prominently in the above-mentioned patents, these problems are alleviated by the reduction in the mass of the catalyst carrier element.

It is a further object of the present invention to provide improved means for mounting a honeycomb type catalyst carrier of the type described which will effectively prevent mechanical deterioration over an extended period. While this objective is best accomplished by dividing the catalyst carrier into separate elements, the mounting principles of the present invention have applicability to the unitary element of the prior art. The improved mounting principles of the present invention are importantly involved with the function of retaining the catalyst carrier longitudinally within the casing structure. Heretofore, longitudinal securement has been effected by simply fixing annular, radially disposed barrier walls at opposite ends of the section of the casing receiving the catalyst carrier. With this arrangement, the longitudinal expansion of the casing during heat up had the effect of loosening the securement because of the differential expansion between the casing and catalyst carrier. The arrangement of the present invention seeks to employ the differential expansion as a means for enhancing the securement rather than detrimentally affecting it.

In accordance with the principles of the present invention, this objective is obtained by providing interior annular walls within the exterior casing structure which are fixed against axial outward movement at the ends of a longitudinal casing section appreciably greater in length than the total length of the catalyst carrier structure disposed therein. The exterior periphery of the annular walls is disposed substantially in heat insulating relation with coextensive portions of the casing. The interior periphery of the annular walls is disposed in flow-confining, heat exchange relation with the gas flow so that they are heated to a greater temperature than the casing and hence will have a greater longitudinal expansion than the coextensive casing portions. This greater longitudinal expansion is directed longitudinally inwardly by virtue of the aforesaid mounting thereof within the casing, thus substantially diminishing the loosening effect theretofore experienced, if not actually enhancing the securement.

The improved mounting principles of the present invention are also importantly involved with the cushioning of the catalyst carrier both longitudinally and radially. As previously indicated, the arrangement of U.S. Pat. No. 3,441,381 provides for cushioning in the radial direction only through the utilization of a sleeve of cushioning material in the annular space provided between the interior periphery of the casing and the exterior periphery of the catalyst carrier. While this disclosed arrangement does not provide for longitudinal cushioning, it has been proposed to provide cushioning washers between the rigid radial barrier walls and the radial annular surfaces of the catalyst carrier element normally engaged thereby and the later related U.S. Pat. No. 3,692,497 discloses a similar modification by which radial cushioning can be achieved.

The need for cushioning is occasioned by the fact that the purification function must be accomplished while the structure provided for this purpose is being subjected to the shocks incident to vehicle transportation. The requirements occasioned by the vehicle transportation environment are not limited to shocks. Another severe limitation imposed by the vehicular environment is package size. These size limitations become particularly critical in the annular or diameter dimension of the catalytic converter structure. Maximum diameter size is desirable since the catalyst contact area increases as a function of the square of the diameter.

In the prior art arrangements, the effective diameter size of the catalyst carrier element is reduced with respect to the actual exterior diameter size of the casing (i.e. the package size) in two respects. First, the exterior diameter of the catalyst carrier is initially chosen to have a dimension less than the interior diameter of the casing so as to provide the annular space to receive the annular cushioning sleeve for resisting radial shocks. Second, the effective diameter of the element is further reduced by the radial barrier walls blocking flow through the outer annular passages of the catalyst carrier element where mounting contact is made to effect longitudinal securement.

Another object of the present invention is to provide improved means for mounting a catalyst carrier element of the type described in which both radial and longitudinal cushioning can be achieved without diminishing the effective diameter of the catalyst carrier element to the dual extent of the prior art. This objective is obtained in accordance with the principles of the present invention by utilizing a catalyst carrier element having an exterior diameter size which is essentially equal to the interior diameter size of the casing and forming in the outer annular face portions thereof annular surfaces which face radially and longitudinally outwardly. Cushioning can then be provided by cushioning rings held in engagement with these annular surfaces.

Another object of the present invention is the provision of a catalytic converter of the type described which is simple in construction, economical to manufacture and effective in operation.

These and other objects of the present invention will become more apparent during the course of the following detailed description and appended claims.

The invention may best be understood with reference to the accompanying drawings wherein an illustrative embodiment is shown.

In the drawings:

FIG. 1 is a longitudinal sectional view of a catalytic converter embodying the principles of the present invention; and FIG. 2 is a cross-sectional view taken along the line 2—2 of FIG. 1.

Referring now more particularly to the drawings, there is shown therein a catalytic converter, generally indicated at 10, which embodies the principles of the present invention. It will be understood that the catalytic convertor 10 is arranged to be incorporated within a conventional exhaust system for the internal combustion engine of an automotive vehicle. To this end, the catalytic convertor 10 includes a casing structure, generally indicated at 12, having an inlet 14 adapted to be connected within the exhaust system so as to receive the exhaust gases emitted from the automotive engine preferably in a position as close to the engine as possible and an outlet 16 for discharging the exhaust gases into the system after they have passed through the casing structure.

Disposed within the casing structure 12 is a catalyst carrier means sized in accordance with the principles of the present invention but constructed generally in accordance with the teachings set forth in U.S. Pat. No. 3,441,381, the disclosure of which is hereby incorporated by reference into the present specification. In accordance with the principles of the present invention, the catalyst carrier means embodied within the preferred catalytic converter 10 is in the form of a plurality of separate catalyst carrier elements 18 of porous, inert, solid, refractory material in skeletal form providing a multiplicity of generally parallel closely adjacent flow passages 20, each extending throughout the longitudinal extent thereof. The catalyst carrier elements 18 have a catalyst deposited on surfaces of macropores communicating with the passages 20 and surfaces defining the passages 20, which catalyst is preferably an oxidation catalyst although it will be understood that a reduction catalyst or a combination catalyst may be utilized. Here again, while any known catalyst may be utilized, preferably the catalyst utilized is in accordance with the disclosure of the above-mentioned United States patent.

The catalytic converter 10 also includes mounting means, generally indicated at 22, for mounting the catalyst carrier elements 18 within the casing structure 12, in longitudinally spaced relation so as to prevent the flow of gases within an annular volume adjacent the interior periphery of the associated casing structure 12 and to confine the flow of gases within an inner volume within which substantially the entire annular extent of the catalyst carrier elements 18 are disposed.

While the casing structure 12 may assume any desired form, in the preferred embodiment shown the casing structure includes a cylindrical wall section 24 having a longitudinal extent which is appreciably in excess of the total longitudinal extent of the catalyst carrier elements 18. The casing structure also includes a diverging section 26 at the upstream end of the cylindrical section 12 which defines the inlet 14 and a converging section 28 adjacent the downstream end of the cylindrical section 12 which defines the outlet 16.

In terms of components, the mounting means 22 includes a plurality of metallic annular members 30 of substantially identical construction, the number of which (four) exceed by one the number of separate catalyst carrier elements (three), and a plurality of cushioning rings 32, the number of which (six) is double the number of catalyst carrier elements. As shown in FIG. 1, the annular members 30 are disposed within the casing section 24 in aligned alternating stacked or sandwich fashion with respect to the elements 18, there being two outer members 30, one upstream of the upstream element 18 and one downstream of the downstream element 18 and two inner members, one between each adjacent pair of elements 18. These annular members 30, which are disposed within the aforementioned annular volume, constitute annular wall means, the interior periphery of which is in flow confining and heat exchange relation with the gases flowing through the aforementioned inner volume and the exterior periphery of which is disposed in heat insulating relation to the longitudinal coextensive portions of the casing section 24. While this heat insulating relationship could be provided by suitable heat insulating material, it is preferable to accomplish the heat insulating relationship by means of air disposed with spaces 34 provided between the exterior periphery of the annular members 30 and the interior periphery of the casing section 24. To this end, the annular members are preferred formed with a channel shaped cross-sectional configuration, thus providing two end portions 36 in the form of legs or barrier walls extending radially outwardly from the central cylindrical annular portion thereof.

Each cushioning ring 32, which is likewise disposed within the aforesaid annular volume adjacent the interior periphery of the casing section 24, is preferably in the form of a knitted sleeve of metallic wire compressed into a generally triangular cross-sectional configuration so as to have a density of approximately 20% of the wire. A preferred metallic wire material is Inconel X-750 with a preferred size of 0.0045 inch diameter. As shown in FIG. 1, two cushioning rings 32 are associated with each catalyst carrier element 18 adjacent opposite face portions thereof. Each catalyst carrier element 18 is of cylindrical form with an exterior diameter generally equal to the interior diameter of the cylindrical casing section 24. The face portion of each element 18 disposed within the aforementioned annular volume is formed with surface means which faces longitudinally and radially outwardly of the element in the form of an angular annular surface 38. Each angular annular surface 38 is preferably disposed at an angle of approximately 45°. As shown in FIG. 1, each cushioning ring 32 is disposed in engagement between an associated angular annular surface 38 and adjacent barrier wall or leg 36 of an associated annular member 30. It will be understood that the surface means 38 may assume other configurations so long as the configuration provides both longitudinally and radially outwardly facing portions or directional components.

The parts of the catalytic convertor 10 thusfar described are preferably assembled in operative relation in the following manner. Initially, one of the outer annular members 30 is positioned within one end of the casing section 24 and the outer leg 36 thereof is peripherally welded thereto, as indicated at 40. Next, the cushioning rings 32, catalyst carrier elements 18 and remaining annular members 30 are positioned within the casing section 40 in the sandwich fashion heretofore noted. A compressive force, as, for example, approximately 100 pounds, is then applied to the outer annular member so that the inner sandwich assembly is forced firmly together and the outer leg 36 of the outer member is then peripherally welded to the opposite end of the casing section 24, as indicated at 42, while the compressive force is maintained. The assembly is completed by peripherally welding the inlet and outlet sections 26 and 28 to outer legs of the respective outer annular members 30. It will be understood that the above assembly procedures are preferred, other arrangements may be utilized. For example, the inlet and outlet sections could each be formed of a cylindrical section having the interior periphery of a radial ring welded thereto, the exterior periphery of which is welded directly to the casing section 24. Such rings could be used as part of the mounting means with one being initially welded to the casing section and the other being welded with the sandwich assembly under compression as aforesaid, in which case the outer annular members 30 would be free of rigid fixed connections with the casing section 24 the same as the inner annular members. The above described assembly procedure is preferred since it serves to load the cushioning rings 32, thus insuring that each catalyst carrier element 18 is securely held or suspended in a manner which will provide a highly desirable cushioning effect substantially preventing mechanical deterioration during use.

The selection of the longitudinal dimension of each catalyst carrier element 18, and the longitudinal dimension of each inner annular member 30, are particularly important considerations in accordance with the principles of the present invention in order to accomplish the advantages of the method teachings heretofore stated. These advantages are based upon the fundamental principle that heat transfer and conversion efficiency, which are both basically a function of the collision of gas molecules with the flow confining surfaces containing the catalyst, are more effectively achieved by turbulent flow than laminar flow.

For any fully developed flow of fluid through a conduit, the condition (i.e. turbulent or laminar) of the flow is determined by the Reynolds number, which can be calculated from the formula $Re = Vd/v$ where $Re$ is the Reynolds number, V is the velocity of flow, $d$ is the hydraulic diameter of the conduit and $v$ is the viscosity of the fluid. When this general formula is applied to the particular flow conditions presented by the exhaust emissions from typical automotive engines, it becomes immediately apparent that the viscosity of the fluid is substantially constant leaving only two variables; namely, velocity and hydraulic diameter. These variables are limited when viewed in the light of the basic criteria of any automotive engine exhaust system which is to perform all necessary functions including the discharge of the exhaust gases without creating substantial power robbing back pressure on the engine. Consequently, severe flow restrictions involving high pressure drops are to be avoided.

With the above limitations as to pressure drop in mind, it will be evident that for an appropriate size diameter of exhaust pipe bleeding from the engine, the velocity of flow is a direct function of the quantity of exhaust gases emitted per unit time. Moreover, the amount of exhaust gases per unit time will vary depending upon the engine size and speed. Typical automotive engine size variation is from an approximately 100 cu. in. displacement (4 cyl.) to 500 cu. in. displacement (8 cyl.). Typical speeds do not vary appreciably with engine size but all vary generally within a range of from 600 rpm (slow idle) to 4000 (full throttle).

With repect to variation in engine speed, since the initial period during cold start-up presents the most difficult pollution test standard to meet and the engine speed during this period is at fast idle, this speed is chosen for determining optimum selection of the catalytic converter variables noted above rather than any other one speed or average. When this speed is related to displacement in terms of standard cfm, a range of values from 30 to 12 scfm is obtained for the displacement range previously noted. Moreover, when it is considered that the exhaust systems for high displacement V-8 engines are usually dualized, the range for practical purposes may be considered from 30 to 90 scfm. Moreover, since the size of the exhaust pipe utilized to handle the flow range is normally increased with increased displacement, it can be seen that the Reynolds number at fast idle for the entire range will be generally the same. Thus, at the lower end of the range, a typical exhaust pipe size for 100 cu in. engine is 1½ inch O.D. which gives a velocity of 120 fps and a Reynolds number of 14,000, at fast idle speed. These calculations give a clear indication that the flow through the inlet 14 at fast idle is turbulent (well above the critical Reynolds number of approximately 2300) and further calculations would show that this turbulent condition is maintained even at slow idle as well as at higher speeds up to full throttle for all engines.

From the above it can be seen that the conditions presented to the converter in automotive engine pollution control are essentially always turbulent but there are important packaging conditions presented by virtue of the physical environment of these flow conditions which must also be taken into consideration. These packaging conditions place severe limitations of size and economics on the procedures and structures through which catalyst contact can be practically effected. The packaging requirements concerning the diameter size of the catalytic converter place an initial limitation on the diameter size of the catalyst carrier elements 18 which, in turn, places a limitation upon the total cross-sectional flow area which can be provided by the passages 20 therein. The packaging requirements concerning longitudinal size of the catalytic converter place limitations on the maximum size of each passage 20 since it is not possible to achieve the required contact area by extending the longitudinal dimension.

The result of these packaging limitations is to effectively prevent the continued maintenance of the gases in the desirable turbulent condition in which they are presented, during the entire catalytic contact. By following the principles of the present invention the maintenance of turbulent flow during catalytic contact is optimized. This optimization is achieved by the aforesaid sizing of the elements 18 and annular members 30.

In accordance with the principles of the present invention, the sizing of each of the elements 18 is such that when the engine is at fast idle the exhaust gases will pass substantially entirely through the passages thereof before being converted into fully developed laminar flow.

The longitudinal distance within which the turbulent flow entering any one passage is converted into fully developed laminar flow is determined by the formula $l = 0.05 \, R_e \, d$ where $l$ is the transition length, $R_e$ is the Reynolds number and $d$ is the hydraulic diameter (Langhaar, Journal Applied Mech. Vo. 64, 1942, p. A-55). The advantages of the present invention become readily apparent when this formula is applied to a specific example of the present invention and to an example following the prior art teachings by utilizing a comparable unitary catalyst carrier element. A specific example of a catalytic converter 10 embodying the principles of the present invention used with an American Motors 6 cylinder engine having a 258 cubic inch displacement is as follows: the cylindrical casing section 24 has an outside diameter of 3½ inches and a wall thickness of 0.06 inch; each catalyst carrier element 18 (AlSiMag 795 Thermacomb 12 nominal corrugations per inch - wall thickness 0.008) has a longitudinal dimension of ¾ inch, a passage hydraulic diameter of 0.042 inch and a passage density of 426 passages per square inch; each annular member 30 has an interior diameter of 3 inches and a longitudinal dimension of ¾ inch; the number of elements is 6; the overall length of the converter is 11 inches with the inlet 14 and outlet 16 being 2¼ inches. Considering fast idle speed to be 1200 rpm, the velocity in each passage 20 is 122 feet per second (assuming the same flow to exist in all passages) and the Reynolds number is 427 in each passage. Substituting $R_e = 427$ and $d = 0.042$ inch in the above formula gives a transition length of 0.897 inches. Thus, with this specific example the flow at fast idle through the passages 20 of the upstream element 18 never reaches a fully developed laminar condition.

In accordance with the principles of the present invention the sizing of the annular members 30 is such that at all engine speeds the partially or fully developed laminar flow issuing from the passages is combined and converted into turbulent flow before entering the passages in the next element 18. Consequently, the transition length figures noted above are applicable to each element 18.

Considering the same commercial catalyst carrier indicated above mounted as a single unit having a length of 4½ inches (¾ inch × 6) in the manner taught by U.S. Pat. No. 3,441,381, the same transition length of 0.897 inches is calculated so that at fast idle almost 80% of the catalyst contact is made with the gases in a fully developed laminar condition as compared with none with the specific example of the present invention. Thus, during cold start tests, where the initial speed is fast idle, significantly better performance can be achieved by the present invention since turbulent contact will heat up the catalyst carrier means faster than fully developed laminar flow (a result which is enhanced by the diminished unitary mass of each catalyst carrier element as compared to one large element) and will effect a more efficient pollution conversion than fully developed laminar flow.

In terms of dimensional relationships, the principles of the present invention can be carried out to achieve these improved results if the maximum longitudinal dimension of each catalyst element is made less than 40 times the hydraulic diameter of the passages 20 provided therein and the space between adjacent elements is greater than 10 times the aforesaid hydraulic diameter.

The minimum size of the elements and the maximum size of the intervening space are determined by physical limitations due to the aforesaid environmental conditions. With respect to minimum element size, the basic physical limitation is that the element must not be made so thin that it does not have sufficient structural integrity to withstand the shocks incident to vehicular travel bearing in mind that it is supported only at its periphery. The mounting principles of the present invention provide optimization in this regard. Such optimization is achieved first, because the cushioning rings 32 enable the exterior diameter of the elements to be maximal within the exterior package limitations and hence the effective area to be maximal and second, because the manner of mounting the annular members 30 within the casing section minimizes loosening of the securement of the elements 18 due to differential temperature expansion in use. In this regard, it will be noted that since the peripheral welds 40 and 42 constitute the only rigid securement of the mounting structure with the casing structure and since the annular members 30 are disposed in heat insulating relation with respect to the coextensive portions of the casing section 24, upon heat-up the members 30 will expand more than such coextensive positions and such greater expansion will be applied to the elements in a direction to compensate for the differential expansion of the elements with respect to the portions of the casing coextensive therewith. This differential expansion compensation function is a factor in determining the maximum size of the length of the members 30 along with the longitudinal package size limitations. The ¾ inch size for both the elements 18 and members 30 given in the example above is therefore a preferred specific example for both.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

We claim:

1. A catalytic converter comprising:
   an annular casing structure having an inlet for receiving a flow of exhaust gases from an automotive engine or the like and an outlet for discharging the gases received in said inlet after flowing through said casing structure;
   catalyst carrier means of porous, inert, solid, refractory material in skeletal form providing a multiplicity of generally parallel closely adjacent flow passages each extending throughout the longitudinal extent thereof;
   catalyst means deposited on surfaces of macropores communicating with said passages and surfaces defining said passages;
   said casing structure having a cylindrical section between the inlet and outlet thereof within which said catalyst carrier means is disposed;
   said catalyst carrier means being generally cylindrical in form and having an exterior diameter generally equal to the interior diameter of said cylindrical casing section;
   means fixed at the ends of said casing section against longitudinal movement with respect thereto in directions longitudinally outwardly of said casing section for mounting said catalyst carrier means within said casing structure in a manner which substantially prevents flow of gases through said casing structure within an annular volume adjacent the interior periphery thereof throughout the longitudinal extent of said section and confines the flow of gases through an inner volume encompassed thereby within which substantially the entire extent of said catalyst carrier means is disposed,
   said catalyst carrier means having relieved face portions disposed within said annular volume;
   said mounting means including an annular barrier wall mounted within said cylindrical section adjacent each relieved face portion,
   annular cushioning means including a ring formed of compressed metallic wires disposed between each annular barrier wall and face portion,
   said barrier walls being mounted within said cylindrical section in compression applying relation to the associated cushioning means,
   each barrier wall and associated face portion including cushioning means engaging annular surfaces disposed with respect to one another so that the compression of the associated cushioning means is transmitted to the associated face portion with a directional component radially inwardly with respect to said catalyst carrier means and a directional component longitudinally inwardly with respect to said catalyst carrier means.

2. A catalytic converter as defined in claim 1 wherein said annular barrier walls extend radially and said annular surfaces comprise an angular annular surface at each face portion, each annular cushioning means comprising a sleeve of knitted metallic wire compressed into a ring of generally triangular cross-sectional configuration to a density of approximately 20% of the density of said metallic wire.

3. A catalytic converter as defined in claim 2 wherein said angular annular surfaces are disposed at an angle of approximately 45°.

4. A catalytic converter as defined in claim 1 wherein said mounting means further includes longitudinally extending annular wall means extending longitudinally from each barrier wall in a direction away from the associated annular cushioning means, said annular wall extending longitudinally within said casing section substantially throughout the longitudinal extent thereof which is in excess of the longitudinal extent of said catalyst carrier means;

the exterior periphery of said annular wall means being disposed substantially in heat insulating relation to the portion of said casing section longitudinally coextensive therewith;

the interior periphery of said annular wall means being disposed in flow-confining heat-exchange relation to the gases flowing in said inner volume so that said annular wall means is heated by said gases to a temperature greater than the temperature of said cylindrical casing section thereby effecting a longitudinal expansion of said annular wall means between the ends of said cylindrical casing section which exceeds the longitudinal expansion of the portion of said cylindrical casing section longitudinally coextensive with said annular wall means.

5. A catalytic converter as defined in claim 4 wherein said annular wall means includes a pair of outer annular members, each having an outer end portion rigidly fixed to said cylindrical casing structure at one of the ends of said cylindrical casing section, a central cylindrical portion extending longitudinally inwardly therefrom in radially space relation to the longitudinally coextensive portion of said casing section, and an inner end portion which constitutes a barrier wall and is free of rigid connection with said cylindrical casing section.

6. A catalytic converter as defined in claim 4 wherein the longitudinal extent of said annular wall means is at least of the order of the longitudinal extent of said catalyst carrier means.

7. A catalytic converter as defined in claim 4 wherein the exterior periphery of said annular wall means is disposed substantially in heat insulating relation to the interior periphery of the portion of said cylindrical casing section longitudinally coextensive therewith by means of air disposed within an annular space formed therebetween.

* * * * *